United States Patent [19]
Huo et al.

[11] Patent Number: 6,000,415
[45] Date of Patent: Dec. 14, 1999

[54] METHOD AND APPARATUS FOR POSITIONING A RESTRICTOR SHIELD OF A PUMP IN RESPONSE TO AN ELECTRIC SIGNAL

[75] Inventors: David Datong Huo, Campbell; Bret W. Adams, Sunnyvale, both of Calif.; John Jarvis, East Kilbride, United Kingdom

[73] Assignees: Applied Materials, Inc., Santa Clara, Calif.; Motorala, Inc., Schaumberg, Ill.

[21] Appl. No.: 08/855,827

[22] Filed: May 12, 1997

[51] Int. Cl.⁶ ................................... F16K 51/00
[52] U.S. Cl. .................. 137/1; 251/11; 236/101 R; 236/68 R
[58] Field of Search ............... 251/11; 236/68 R, 236/66, 101 R; 137/1

[56] References Cited

U.S. PATENT DOCUMENTS

| | | |
|---|---|---|
| 2,576,954 | 12/1951 | Lucks . |
| 3,860,036 | 1/1975 | Newman, Jr. . |
| 3,895,646 | 7/1975 | Howat . |
| 4,098,296 | 7/1978 | Grasso et al. . |
| 4,230,149 | 10/1980 | Worthen et al. . |
| 4,336,904 | 6/1982 | Jardinier et al. . |
| 4,382,549 | 5/1983 | Christy et al. . |
| 4,828,169 | 5/1989 | Smith . |
| 5,037,061 | 8/1991 | Shopsky ................................ 251/11 |

*Primary Examiner*—Kevin Lee
*Attorney, Agent, or Firm*—Thomason, Moser & Patterson

[57] ABSTRACT

Apparatus, positioned at an inlet port to a pump, for shielding the pump from a process chamber of a semiconductor wafer processing system, where the apparatus has a controllably variable effective throughput area, and method for electrically controlling the size of the effective throughput area. Specifically, the apparatus is a controllable restrictor shield supported by an actuator, having a first effective throughput area and a second effective throughput area, where the first effective throughput area is typically less than the second effective throughput area. The size of the effective throughput area is directly responsive to an electric signal that controls the actuator.

16 Claims, 5 Drawing Sheets

METHOD AND APPARATUS FOR POSITIONING A RESTRICTOR SHIELD OF A PUMP IN RESPONSE TO AN ELECTRIC SIGNAL

BACKGROUND OF THE DISCLOSURE

1. Field of the Invention

The present invention relates to semiconductor processing equipment and, more particularly, to a controllable restrictor shield, located between a process chamber and a pump, having a controllably variable effective throughput area.

2. Description of the Background Art

To produce a sufficient vacuum for processing semiconductor wafers in a process chamber of a semiconductor wafer processing system, a cryogenic pump (commonly referred to as a cryo-pump) is used to attain the vacuum. Systems that utilize cryo-pumps include physical vapor deposition (PVD) systems that require an ultra high vacuum (UHV), approximately $5 \times 10^9$ Torr, to achieve optimal process conditions and process performance.

Typically, the cryo-pump is connected to the process chamber via a conduit, where the connection point of the conduit to the process chamber is known as the "cryo-port". The area of the cryo-port opening is critical to achieving particular process results during a deposition process. Although the cryo-port has a fixed area, it is typically fitted with a cryo-pump restrictor shield (referred to herein as a cryo-shield) that defines the effective throughput area of the cryo-port. A typical cryo-shield is an aluminum plate having approximately a six inch (15.25 cm) diameter. The plate contains a plurality of apertures of predefined diameter. The cumulative area of the apertures defines the effective throughput area of the cryo-port. As such, different plates having differing effective areas are installed over the cryo-port depending upon the particular process results desired. One example of a PVD system that uses such a cryo-shield is the Endura model manufactured by Applied Materials, Inc. of Santa Clara, Calif.

Typically, before a process chamber is used to process semiconductor wafers, the chamber goes through a process known as "bakeout", where the chamber is heated by lamps to desorb and evaporate any volatile particles within the chamber. The volatile particles are removed from the chamber by pumping, e.g., usually by using a combination of pump types including turbo-pumps, cryo-pumps, and the like. Once the volatile particles have been pumped from the chamber, the chamber is allowed to cool to a nominal temperature over a period of time known as the cooldown period. A chamber is considered "qualified", for processing when the chamber achieves a sufficient vacuum (e.g., $8 \times 10^9$ to $5 \times 10^9$ Torr) after both bakeout and cooldown are complete. The bakeout and cooldown period can be as long as 80 hours. Thus, for a substantial amount of time, the processing equipment is being initialized and is not processing wafers.

The duration of the bakeout and cooldown period is directly proportional to the effective throughput area of the cryo-port. To facilitate a high gas flow rate during bakeout and reduce the bakeout period, it is desirable to have as large of a cryo-port effective throughput area as possible. However, the cryo-shield is in place during bakeout in anticipation of processing once the chamber is qualified. As such, the cryo-port effective throughput area is inherently limited to the aperture area of the cryo-shield. To remove the cryo-shield and increase the throughput area would require opening the chamber to atmosphere, removing the cryo-shield and then performing another bakeout cycle. The time that the system is unproductive while the throughput area is changed would be intolerable.

Additionally, chamber process pressures frequently need adjusting and fine tuning during the processing of semiconductor wafers. Since traditional restrictor shields are fixed and the effective throughput area of the cryo-port is also fixed, the processing pressures cannot be adjusted or controlled by the traditional restrictor shields.

Therefore, there is a need in the art for a restrictor shield having a controllably variable effective throughput area such that the effective throughput area of the cryo-port can be controllably increased or decreased during bakeout or processing to precisely control chamber vacuum conductance.

SUMMARY OF THE INVENTION

The disadvantages heretofore associated with the prior art are overcome by the present invention of apparatus, positioned at an inlet port to a pump, for shielding the pump from a process chamber of a semiconductor wafer processing system, where the apparatus has a controllably variable effective throughput area. Specifically, the apparatus is a controllable restrictor shield for a pump having a first effective throughput area and a second effective throughput area, where the first effective throughput area is typically less than the second effective throughput area. The selection of the effective throughput area is directly responsive to an electrically controllable actuator.

In particular, a first embodiment of the controllable restrictor shield contains a mounting ring, a shield portion, and an electrically controllable actuator. The restrictor shield may vary in design to include having the mounting ring and shield combined into a unitary shield or having the shield divided in portions.

In each case, the electrically controllable actuator is a bimetal strip that is attached at a first end to the shield portion and attached at a second end to the mounting portion or chamber wall. The bimetal strip is an elongated, typically rectangular, element containing two different materials bonded to one another. The materials are typically metals or metal alloys. Due to the differing rates of thermal expansion of each material comprising the bimetal strip, such a strip deforms (bends) as the strip is heated. The amount of bending is proportional to the temperature of the bimetal. By judiciously selecting the materials that comprise the strip, the strip can be designed to repeatedly bend the same amount for a given temperature profile.

To provide a repeatable, controllable temperature profile, the actuator contains a resistive heater that is affixed to the bimetal strip. The resistive heater is activated by electric current. To provide a very accurate temperature profile, a heater controller is electrically connected to the resistive heater to monitor and precisely control the temperature of the resistive heater.

Thus, as the bimetal strip is heated by the resistive heater, the strip bends and moves the shield portion away from the pump port. As such, an opening is formed between an edge of the shield portion and the inner edge of the mounting portion or chamber wall. This opening increases the effective throughput area of the controllable restrictor shield, i.e., producing the second effective throughput area.

The utilization of a controllable restrictor shield having a controllably variable effective throughput area has achieved substantial reduction in the bakeout period. For example, empirical data has shown the typical bakeout period to require 60 to 80 hours. In contrast, the bakeout period for a system using the present invention is reduced to 30 to 35 hours.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention is, in general, a method and apparatus for positioning a cryo-pump restrictor shield, located between a process chamber and a pump, such that the cryo-port has a controllably variable effective throughput area. Specifically, the controllable restrictor shield has a first effective throughput area and a second effective throughput area, where the first effective throughput area is typically less than the second effective throughput area. An electrically controllable actuator facilitates the selection of the particular throughput area that is used at any particular time. One form of electrically controllable actuator is a resistive heater. As such, the effective throughput area is directly responsive to the temperature of the actuator as determined by current flowing through the resistive heater. The second effective throughput area is generated when the resistive heater heats a bimetal strip. The first effective throughput area occurs when the actuator is idle to establish a predefined effective throughput area for an outlet port of the process chamber. Consequently, the invention facilitates fine-tuning chamber process conditions resulting in reduction of the bakeout periods and the optimal effective throughput area for the outlet port to achieve particular process results.

Figure 1:
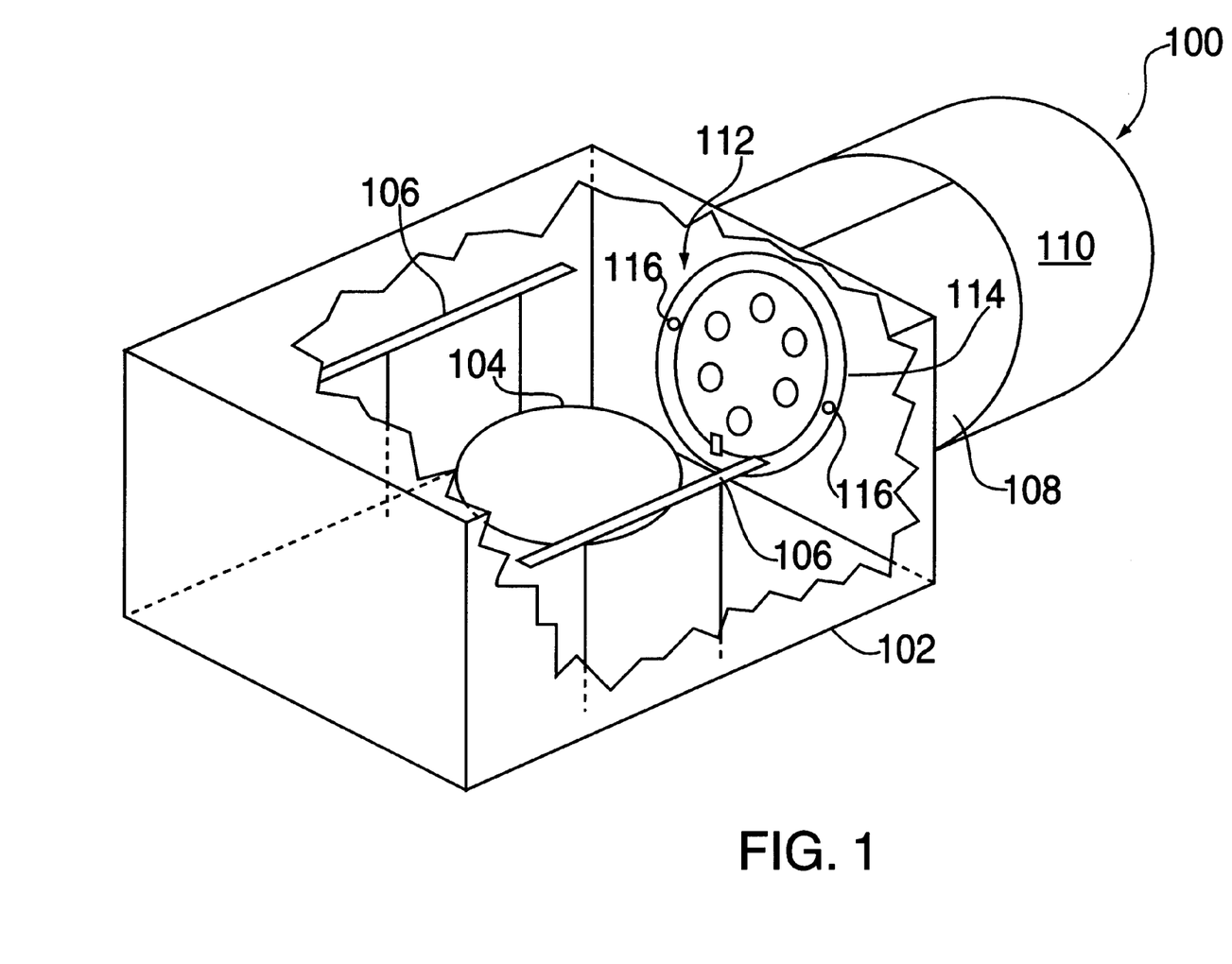
FIG. 1 is a schematic, perspective view of a process chamber incorporating the present invention.

FIG. 1 depicts a schematic view of a conventional process chamber 102 of a semiconductor processing system 100 that incorporates a first embodiment of the controllable restrictor shield 112 of the present invention. In the depicted embodiment, the controllable restrictor shield is located between the process chamber 102 and a cryogenic pump 110. Although, in a broad sense, the controllable restrictor shield of the present invention can be used as a controllably variable flow regulator for any type of pump.

A typical wafer processing system that incorporates the invention includes a wafer chuck 104 for supporting the wafer within the system during processing, heater lamps 106 for heating the chamber during bakeout, a cryo-pump 110 (or other pump type), a vacuum conduit 108 connecting the cryo-pump to the chamber, and a cryo-port 114 located at the junction of the conduit 108 and the chamber 102. One example of such a system is the PVD system manufactured under model name Endura by Applied Materials, Inc. of Santa Clara, Calif.

The controllable restrictor shield 112 of the present invention replaces the conventional cryo-shield such that the present invention can be retrofitted into a system that presently uses a conventional cryo-shield. As such, the controllable restrictor shield fits over the cryo-port 114 and is affixed to a wall of the process chamber 102 proximate the cryo-port. Typically, the controllable restrictor shield of the present invention is screwed to the chamber walls using mounting holes 116 that align with the mounting holes for a conventional cryo-shield.

Figure 2:
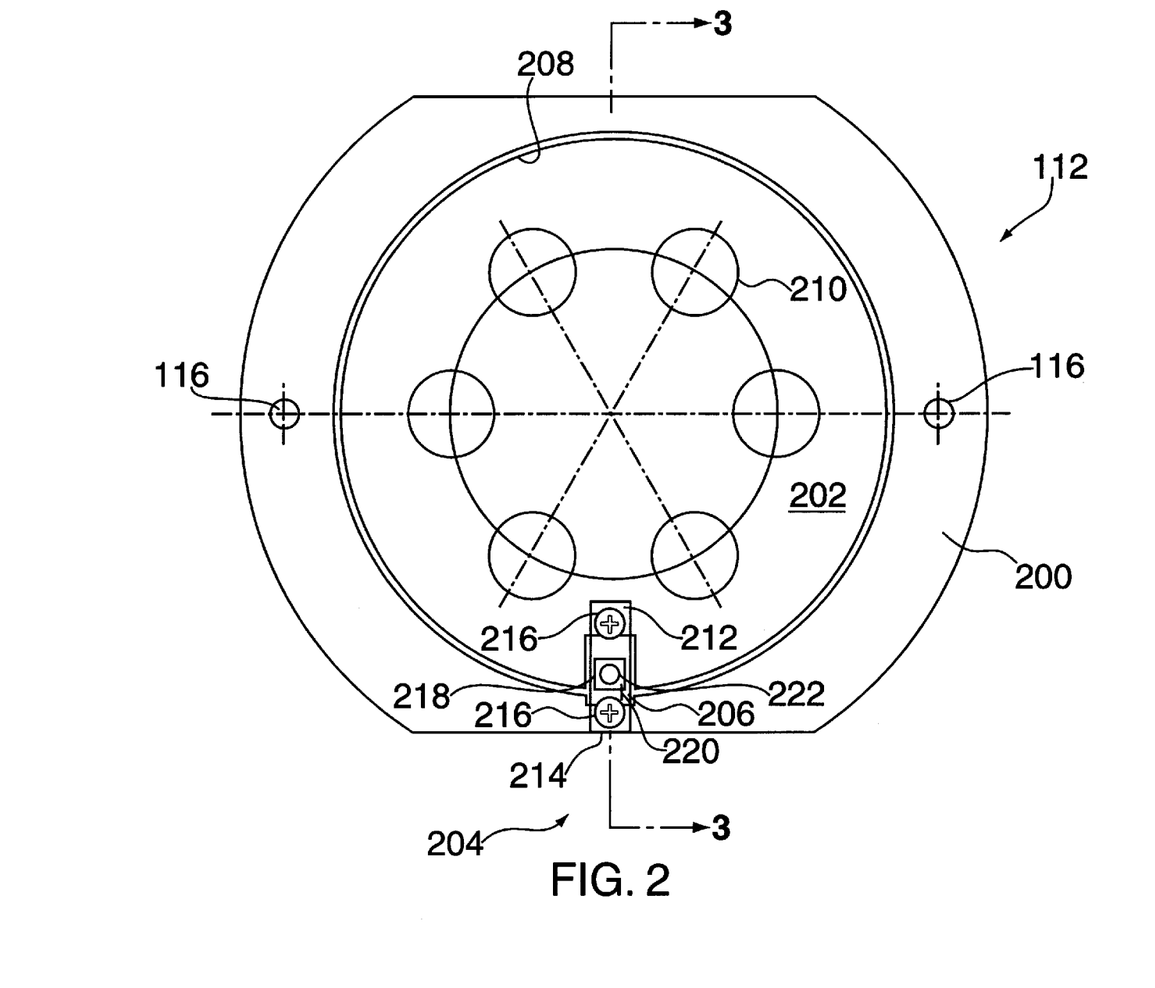
FIG. 2 depicts a front, plan view of a first embodiment of the controllable restrictor shield of the present invention.

FIG. 2 depicts a front, plan view of the first embodiment of the controllable restrictor shield 112 of the present invention. The controllable restrictor shield contains a mounting ring 200, a shield portion 202, and an actuator 204. The mounting ring 200 is a circular stainless steel disk of approximately six inches (15.25 cm) in diameter having a central aperture 208 of approximately 5.35 inches (13.59 cm) in diameter. The mounting ring has an outer diameter to fit over, and be slightly larger than, the diameter of a pump attachment port (cryo-port) of the process chamber. Additionally, the mounting ring has a plurality of mounting holes 116 that match the mounting holes within the chamber walls that are typically used to affix a conventional cryo-shield over the cryo-port.

The shield portion 202 is a disk (preferably aluminum) having a diameter that is slightly smaller than the central aperture diameter, e.g., approximately 5.25 inches (13.34 cm), and has a thickness of approximately 0.06 inches (0.15 cm). To define a first effective throughput area of the controllable restrictor shield, the shield portion contains a plurality of apertures 210 (e.g., six 0.906 inch (2.30 cm) diameter circular apertures positioned at 60 degree intervals along a three inch diameter circle). The apertures are uniformly spaced apart and lie in a circular pattern about the center of the shield portion. This pattern of apertures should be considered as merely illustrative, the particular pattern will be defined by the nature of the processing to be accomplished and the desired flow pattern through the restrictor. Also, the particular diameter of the apertures that define the first effective throughput area of the controllable restrictor shield are defined by the particular process to be accomplished.

The shield portion 202 is affixed to the mounting ring 200 via the actuator 204. The actuator is a bimetal strip 206 fabricated from two materials having differing thermal coefficients of expansion. The two materials are formed into separate strips, then bonded to one another to form the actuator 204. The strip, when exposed to certain temperatures, will deform (bend). By judiciously selecting the materials for the strip 206, the deformation of the strip is a well-defined proportional function of temperature. Also, to ensure that the shield portion moves into the conduit connecting the chamber to the pump, the material with the lesser coefficient of expansion should face the pump.

The materials should satisfy the following criteria:

(a) both materials should be process transparent or compatible;

(b) the strip must flex sufficiently in response to the temperature range defined by resistive heater temperatures;

(c) the strip should revert to its original shape after heating is complete; and (d) the materials must be readily available and cost effective.

Bimetal strips that fulfill this criteria are commercially available from Texas Instruments—Thermostat Metals Division of Austin, Tex. One example is the bimetal strip available as "B1—Truflex". This strip is fabricated of a combination of stainless steel (a high expansion alloy) and Invar (a low expansion alloy). A typical dimension of the actuator using this type of strip to support a 5.25 inch (13.34 cm) shield portion is approximately 1.25 inches (3.17 cm) long, half inch (1.27 cm) wide, and 0.045 inches (0.114 cm) thick. Another bimetal example available from Texas Instruments is "P675 Truflex", made of a combination of Invar and a high molybdenum alloy. The following discussion assumes the actuator is fabricated of B1-Truflex having the dimensions stated above.

The actuator 204 is affixed at a first end 212 to the shield portion 202 using a fastener 216 such as a rivet, screw and nut combination, spot weld, and the like. A second end 214 of the member is similarly affixed to the mounting ring 200. To facilitate non-binding motion of the shield portion relative to the mounting ring, a rectangular notch (approximately 0.600 inches (1.52 cm) wide) is cut into the edge of the shield portion and mounting ring proximate the attachment location of the actuator.

The actuator 204 further comprises a resistive heater 218 and a wire 220 for providing current to the heater 218. The resistive heater 218 is electrically driven and supplied by wire 220. The resistive heater is affixed to actuator 204 by using a fastener 222 such as a rivet, screw and nut combination, spot weld, and the like, between first end 212 and second end 214 of the actuator. The resistive heater must heat at temperatures that adequately activate and deform the bimetal strip (temperature range 0° to 150° Celsius). Such resistive heaters are commercially available from Osram Sylvania Inc. under the model number 50T4Q/UVS/CL/AX.

Figure 3:
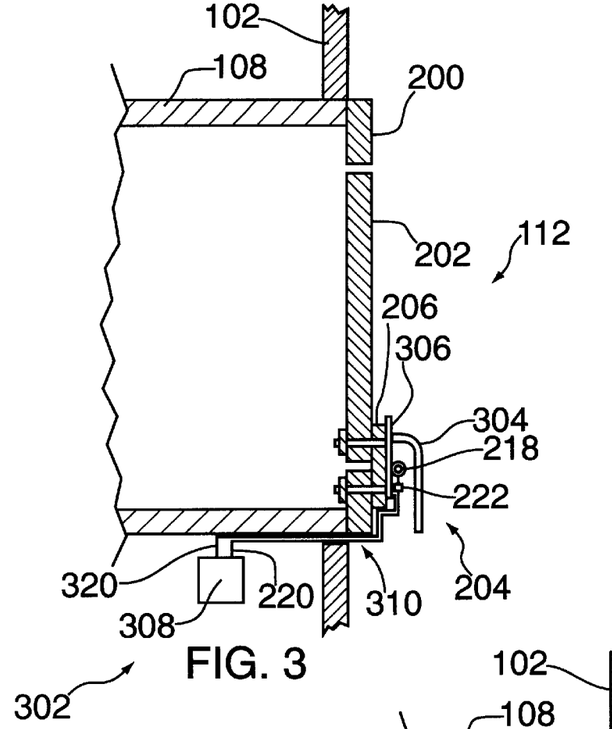
FIG. 3 depicts a vertical, cross-sectional view of the controllable restrictor shield of FIG. 2 in a closed position.

FIG. 3 depicts a vertical, cross-sectional view (along line 3—3 of FIG. 2) of the controllable restrictor shield 112. The actuator is shielded from the chamber by heat shield 304. The heat shield ensures that the actuator is not activated by the bakeout lamps and/or the chamber environment. The heat shield 304 is mounted to the controllable restrictor shield by welding, and the like. The heat shield is fabricated of aluminum, or other similar materials.

FIG. 3 shows a feedback system 302 of the resistive heater 218. The resistive heater 218 is controlled by the feedback system which comprises a thermocouple 306 and a heater controller 308. The thermocouple is mounted to the bimetal strip by forming a re-entrant, blind hole in the bimetal strip to contain the thermocouple junction. A high temperature ceramic cement, composed of 60% $SiO_2$ and 40% $Al_2O_3$, encapsulates the junction and thermally bonds the thermocouple to the bimetal strip. The thermocouple 306 is electrically connected to the heater controller 308 via a wire 320. The thermocouple sensitivity for this application should be +/−2° Celsius. The thermocouple can be commercially provided by Chromel-Alumel available under model name Typek. Such thermocouples provide temperature information about the resistive heater within an absolute temperature accuracy of +/−1.1° Celsius from a temperature range of 0° to 1100° Celsius. The heater controller 308 responds to the temperature measurement feedback signal provided by the thermocouple and adjusts the temperature of the resistive heater. Wires 220 and 320 pass through a vacuum sealed electrical feedthrough using a vacuum seal o-ring 310 through a wall of the process chamber 102.

Although a feedback system is disclosed to provide the most accurate control of the restrictor shield position, those skilled in the art will understand that the heater may be driven by a simple current supply.

Figure 4:
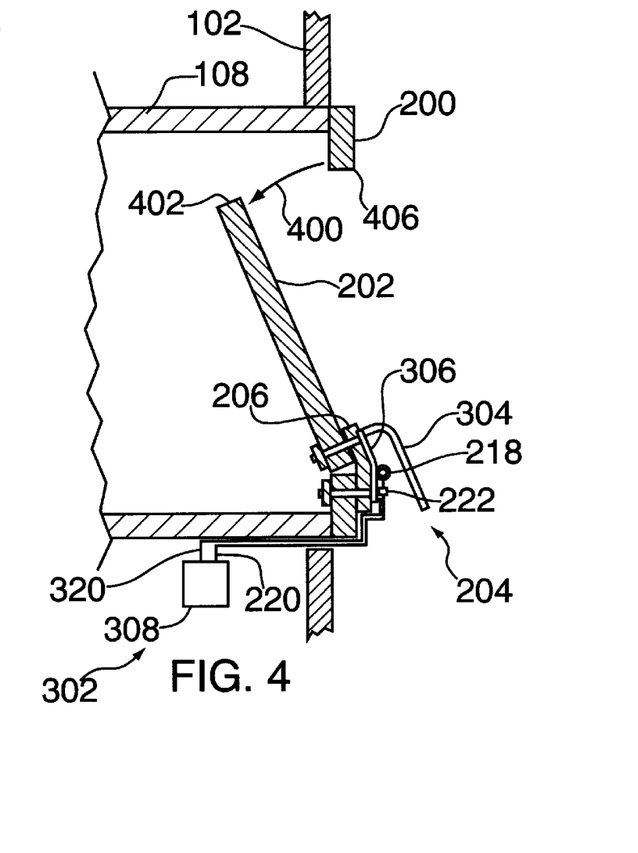
FIG. 4 depicts a vertical, cross-sectional view of the controllable restrictor shield of FIG. 2 in an open position.

FIG. 3 depicts the controllable restrictor shield 112 in the closed position (producing the first effective throughput area) within the process chamber 102 and FIG. 4 depicts a vertical, cross-sectional view of the controllable restrictor shield in the open position (producing the second effective throughput area). To best understand the function of the invention, the reader should refer to both FIGS. 3 and 4 simultaneously.

When the resistive heater 218 is idle, i.e., at a low temperature, the controllable restrictor shield 112 is in the closed position (as shown in FIG. 3). The temperature of the resistive heater 218, to remain closed while using a B1-Truflex bimetal strip, is less than 50 degrees Celsius. At these temperatures, the shield portion 202 is aligned with the mounting ring 200 and the controllable restrictor shield essentially covers the cryo-port. As such, the effective throughput area (first effective throughput area) through which particles approach the cryo-pump is substantially defined by the apertures in the shield portion 202.

When the resistive heater 218 is at a relatively high temperature, e.g., above 100° Celsius, the controllable restrictor shield moves into the open position (as shown in FIG. 4). When using the B1-Truflex bimetal strip and a resistive heater temperature of 100 degrees, the opening 400 between the inner edge 406 of the mounting ring 200 and the edge 402 of the shield portion 202 can exceed one inch. As the resistive heater raises the temperature, the bimetal deforms, by an amount that is proportional to the temperature, forming a cantilever that displaces the shield portion from the closed position to the open position. As such, at high resistive heater temperature, the effective throughput area of the controllable restrictor shield is substantially increased. In short, the more heat that is applied to the bimetal, the larger the size of the effective throughput area. Consequently, whenever necessary, the resistive heater can be activated by the controller 308 to increase the throughput of particles to the cryo-pump while the shield is in the open position and the process chamber is rapidly pumped to sufficient vacuum for processing. By judiciously controlling the temperature of the bimetal, the size of the throughput area can be set to any size between fully closed and fully open.

After the resistive heater is turned off, and the actuator cools, the controllable restrictor shield automatically returns to its closed position and creates the first effective throughput area.

Using the present invention in a conventional PVD system has resulted in substantially reduced bakeout periods and precise control of the chamber environment. A PVD system using a conventional controllable restrictor shield requires a bakeout/cooldown period of between 60 and 80 hours to attain qualified status and the process environment conditions are set and predefined, while the same PVD system using the present invention requires a bakeout/ cooldown period of between 30 and 35 hours to attain qualified status and chamber conditions can be fine-tuned during semiconductor processing.

Figure 5:
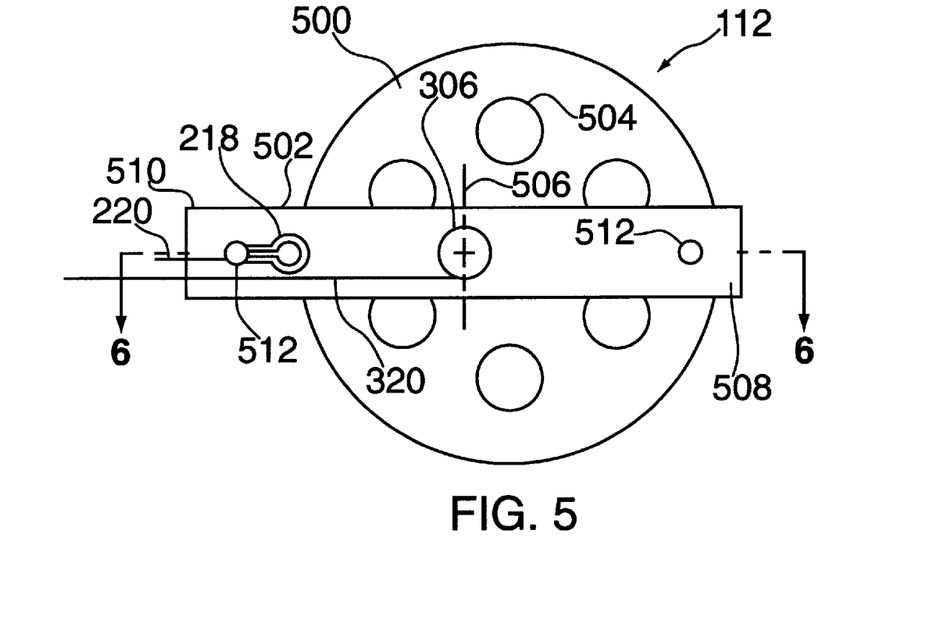
FIG. 5 depicts a front, plan view of a second embodiment of the controllable restrictor shield of the present invention.

FIG. 5 depicts a second embodiment of the present invention. The shield portion 500 is an aluminum disk having a diameter that is slightly larger than the cryo-port diameter, e.g., approximately six inches (15.25 cm), and has a thickness of approximately 0.06 inches (0.15 cm). To define a first effective throughput area of the controllable restrictor shield, the shield portion contains a plurality of apertures 504 (e.g., six circular apertures). The apertures are uniformly spaced apart at 60 degree intervals and lie in a circular pattern about the center of the shield portion. This pattern of apertures should be considered as merely illustrative, the particular pattern will be defined by the nature of the processing to be accomplished and the desired flow pattern through the restrictor. Also, the particular diameter of the apertures that define the first effective throughput area of the controllable restrictor shield are defined by the particular process to be accomplished.

The shield portion 500 is affixed directly to the chamber wall via the actuator 502. The actuator is a bimetal strip fabricated from two materials having differing thermal coefficients of expansion. A typical dimension of the actuator using B1-Truflex strip to support a six inch shield portion is approximately seven inches (17.78 cm) long, one inch wide (2.54 cm), and 0.045 inches (0.11 cm) thick.

The actuator 502 is affixed at a first end 508 to the shield portion 500 using a fastener 512 such as a rivet, screw and nut combination, spot weld and the like. A second end 510 of the member is similarly affixed to the chamber wall proximate the cryo-port.

Figure 6:
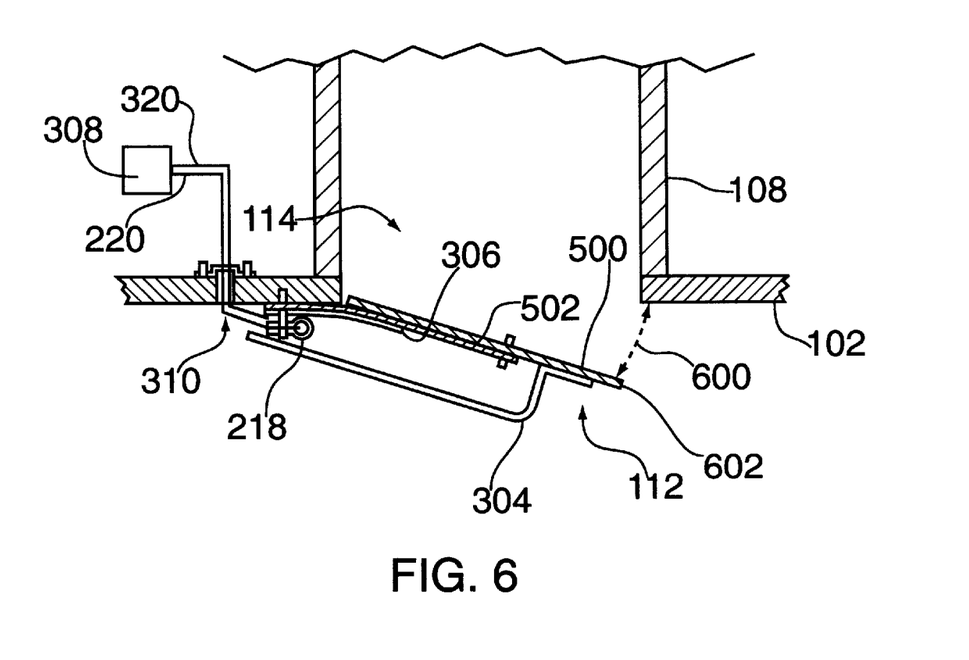
FIG. 6 depicts a vertical, cross-sectional view of the controllable restrictor shield of FIG. 5 in an open position.

As in the first embodiment, the actuator further comprises a resistive heater to facilitate electrical activation of the actuator. As discussed above, the resistive heater 218 is electrically driven and supplied by wire 220. The resistive heater is affixed to actuator 502 by using a fastener 222 such as a rivet, screw and nut combination, spot weld, and the like, between first end 508 and second end 510 of the actuator. Resistive heater 218 can also be affixed by using fastener 512, as shown in FIGS. 5 and 6. The resistive heater must heat at temperatures that adequately activate and deform the bimetal strip (temperature range 0° to 150° Celsius).

FIG. 6 depicts a vertical, cross-sectional view (along line 6—6 of FIG. 5) of the controllable restrictor shield 112 in the open position (producing the second effective throughput area). The heat shield 304 is welded to the controllable restrictor shield 602 and extends over the resistive heater shielding the heater and bimetal strip from radiation from the bakeout lamps. When the resistive heater is at a relatively high temperature the controllable restrictor shield moves to the open position. When using the B1-Truflex bimetal strip as the actuator 502 and a temperature change of 100 degrees Celsius, the opening 600 between the chamber wall and the edge 602 of the shield portion 500 can exceed one inch (2.54 cm). As the resistive heater raises the temperature, the bimetal deforms forming a cantilever that displaces the shield portion from the closed position to the open position (as shown by the arrow). As such, the effective throughput area of the controllable restrictor shield is substantially increased. Consequently, if heated during bakeout, the throughput of particles to the cryo-pump is increased while the shield is in the open position and the process chamber is rapidly pumped to sufficient vacuum for substrate processing.

After the resistive heater is turned off and the actuator cools, the controllable restrictor shield automatically returns to its closed position and creates the first effective throughput area. At these lower temperatures, the shield portion 500 abuts the chamber wall and the controllable restrictor shield essentially covers the cryo-port. As such, the effective throughput area (first effective throughput area) through which particles approach the cryo-pump is substantially defined by the apertures in the shield portion 500.

Figure 7:
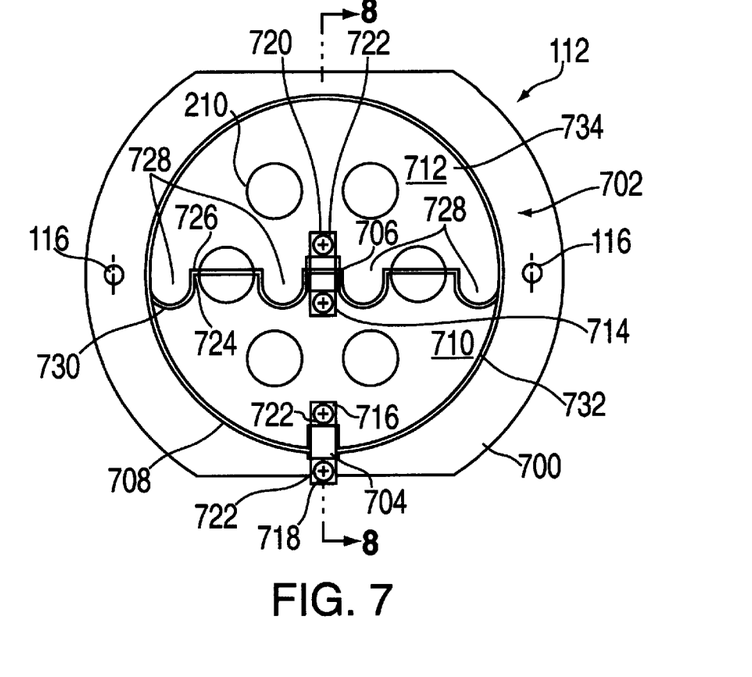
FIG. 7 depicts a front, plan view of a third embodiment of the controllable restrictor shield of the present invention.

FIG. 7 depicts a front, plan view of the third embodiment of the controllable restrictor shield 112 of the present invention. The controllable restrictor shield contains a mounting ring 700, a shield portion 702, first actuator 704, and a second actuator 706. The mounting ring 700 is the same as the mounting ring 200 described with reference to FIGS. 2, 3, and 4 above.

The shield portion 702 is an aluminum disk having a diameter that is slightly smaller than the central aperture diameter, e.g., approximately 5.25 inches (13.34 cm), and has a thickness of approximately 0.06 inches (0.15 cm). To define a first effective throughput area of the controllable restrictor shield, the shield portion contains a plurality of apertures 210 (e.g., six 0.906 inch (2.30 cm) diameter circular apertures positioned at 60 degree intervals along a three inch diameter circle). The apertures are uniformly spaced apart and lie in a circular pattern about the center of the shield portion. In this third embodiment, the shield member contains a lower portion 710 (first portion) and an upper portion 712 (second portion), where each portion has a half moon shape having a straight edge 724, 726 and an arcuate edge 732, 734.

The lower shield portion 710 is affixed to the mounting ring 700 via the first actuator 704. The upper shield portion 712 is attached to the lower shield portion via the second actuator 706. Each of the actuators is a bimetal strip. A typical dimension of each actuator using the B1-Truflex type of strip to support a 5.25 inch (13.34 cm) diameter shield portion is approximately 1.25 inches (3.17 cm) long, half inch wide (1.27 cm), and 0.045 inches (0.11 cm) thick.

The actuator 704 is affixed at a first end 716 to the lower shield portion 710 at the apex of the arcuate edge 732 using a fastener 722 such as a rivet, screw and nut combination, spot weld and the like. A second end 718 of the member is similarly affixed to the mounting ring 700. To facilitate non-binding motion of the shield portion relative to the mounting ring and between the upper and lower shield portions, a rectangular notch (approximately 0.600 inches (1.52 cm) wide) is cut into the edge of the shield portion and mounting ring proximate the attachment location of the first actuator and into the straight edges of both shield portions proximate the attachment location of the second actuator.

The second actuator has a first end 714 attached to the lower shield portion 710 and a second end 720 attached to the upper shield portion 712. The attachment occurs at a point midway along the straight edges 724, 726 of the shield portions and is accomplished using fasteners 722.

Figure 8:
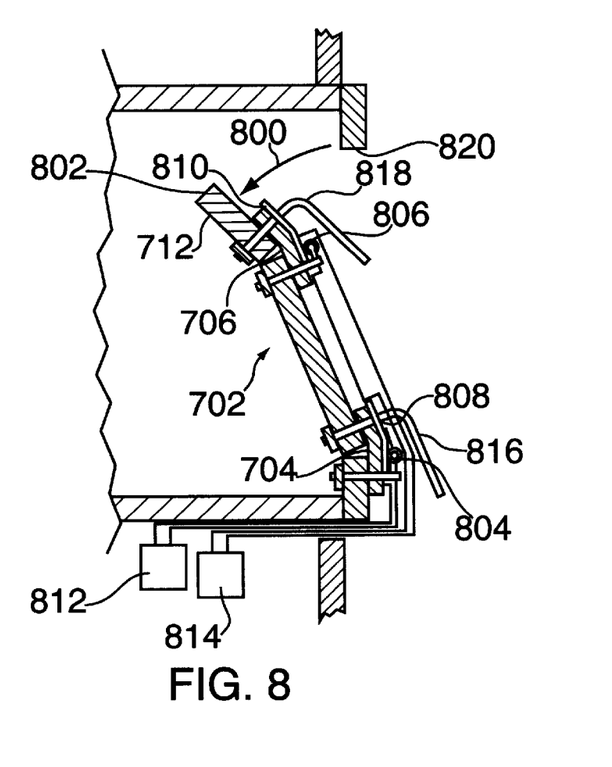
FIG. 8 depicts a vertical, cross-sectional view of the controllable restrictor shield of FIG. 7 in an open position.

FIG. 8 depicts a vertical, cross-sectional view (along line 8—8 of FIG. 7) of the controllable restrictor shield 112 in the open position (producing the second effective throughput area) within the process chamber 102. When the resistive heaters are at a relatively high temperature, the controllable restrictor shield is in the open position. When using the B1-Truflex bimetal as the actuators 704 and 706, an opening 800 forms between the inner edge 820 of the mounting ring 700 and the edge 802 of the shield portion 702. As the temperature rises, the bimetal deforms forming a cantilever that displaces the shield portions from the closed position to the open position.

The first actuator 704 further contains a first resistive heater 804 with a first resistive heater heat shield 816. The second actuator 706 contains elements that are similar to the first actuator. Specifically, the second actuator contains a second resistive heater 806 with a second resistive heater heat shield 818. Both the first actuator and the second actuator have separate feedback systems, each with dedicated thermocouples, 808 and 810, and heater controllers, 812 and 814. The first actuator and second actuator can be singularly activated by their respective heaters independent of one another. Although the two actuators are independent of one another, one skilled in the art could configure one feedback system or power supply for both the first actuator and second actuator.

To further increase the second throughput area when the controllable restrictor shield is in the open position, the straight edges 724 and 726 are scalloped (i.e., have a tongue-in-groove arrangement) such that the upper shield portion has a plurality of tongues 728 that extend into grooves 730 in the lower shield portion and vice versa. In the closed position, the tongue-in-groove portions interlock such that the upper and lower shield portions substantially form a unitary shield portion. Conversely, in the open position, the tongue portions move out of the groove portions to "open" the grooves to form additional apertures.

After the resistive heaters are turned off, and the actuators cool, the controllable restrictor shield automatically returns to its closed position and creates the first effective throughput area.

Although the foregoing embodiments of the invention contain a restrictor shield that is positioned by an electrically controllable actuator. The invention should be understood to encompass having the entire restrictor shield fabricated from bimetal and the heater affixed directly to the shield i.e., the activator and shield are a unitary element. As such, heating the restrictor shield causes the entire shield to flex and alter the size of the throughput area.

There has thus been shown and described a novel controllable restrictor shield having an electrically controllable effective throughput area. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention, which is to be limited only by the claims which follow.

What is claimed is:

1. Apparatus for shielding a pump from a process chamber of a semiconductor wafer processing system, comprising:
    a shield portion for shielding an inlet port to said pump; and
    an electrically controllable actuator, affixed to said shield portion and said process chamber, for moving said shield portion from a first position to a second position in response to an electrical signal.

2. The apparatus of claim 1 wherein said actuator further comprises a bimetal strip.

3. The apparatus of claim 2 wherein said actuator further comprises a resistive heater affixed to said bimetal strip.

4. The apparatus of claim 3 wherein said resistive heater is coupled to a heater controller.

5. The apparatus of claim 4 wherein said actuator further comprises a thermocouple electrically connected to said heater controller.

6. The apparatus of claim 3 wherein said actuator further comprises:
    a heat shield, proximate the resistive heater and the bimetal strip, for thermally isolating the resistive heater and the bimetal strip from a process chamber radiation source.

7. Apparatus for shielding a pump from a process chamber of a semiconductor wafer processing system, comprising:
    a mounting ring attached to said process chamber;
    a shield portion for shielding an inlet port to said pump; and
    an electrically controllable actuator, affixed to said shield portion and said mounting ring, for moving said shield portion from a first position to a second position in response to an electric signal.

8. The apparatus of claim 7 wherein said actuator further comprises a bimetal strip.

9. The apparatus of claim 8 wherein said actuator further comprises a resistive heater affixed to said bimetal strip.

10. The apparatus of claim 9 wherein said resistive heater is coupled to a heater controller.

11. The apparatus of claim 10 wherein said actuator further comprises a thermocouple to supply a feedback signal to said heater controller.

12. The apparatus of claim 8 wherein said actuator further comprises:
    a heat shield, proximate the resistive heater and the bimetal strip, for thermally isolating the resistive heater and the bimetal strip from a process chamber radiation source.

13. The apparatus of claim 7 wherein said shield portion further comprises:
    a first portion and a second portion, where said first portion is affixed to said electrically controllable actuator; and
    a second electrically controllable actuator is affixed to said first portion and said second portion.

14. A method for shielding a pump from a process chamber of a semiconductor wafer processing system, comprising the steps of:
    supporting a shield proximate an inlet port using an electrically controllable actuator;
    shielding, with said shield, the inlet port to said pump from said process chamber; and
    deforming said actuator, in response to an electric signal, to move said shield from a first position to a second position, wherein said first position for said shield defines a first effective throughput area through which particles pass to said pump and wherein said second position for said shield defines a second effective throughput area through which particles pass to said pump.

15. The method of claim 14 wherein said actuator is a bimetal strip affixed to a resistive heater and said method further comprises the steps of:
    applying current to said resistive heater to generate heat; and
    deforming said bimetal strip in response to said heat.

16. The method of claim 15 further comprising the steps of:
    measuring the temperature of the bimetal strip; and
    altering the current to the resistive heater in response to the measured temperature to control an effective throughput area defined by said shield.

* * * * *